(12) United States Patent
Vaidyanathan et al.

(10) Patent No.: US 7,469,230 B2
(45) Date of Patent: Dec. 23, 2008

(54) METHOD AND SYSTEM FOR AUTOMATICALLY DISTRIBUTING FEES, INCLUDING A RESELLER COMMISSION, DURING A DIGITAL FILE TRANSACTION

(75) Inventors: Vijay Vaidyanathan, Los Altos Hills, CA (US); Christopher Allin Kitze, Incline Village, NV (US)

(73) Assignee: Qurio Holdings, Inc., Raleigh, NC (US)

( * ) Notice: Subject to any disclaimer, the term of this patent is extended or adjusted under 35 U.S.C. 154(b) by 1590 days.

(21) Appl. No.: 10/082,884

(22) Filed: Feb. 26, 2002

(65) Prior Publication Data

US 2002/0138440 A1   Sep. 26, 2002

Related U.S. Application Data

(63) Continuation-in-part of application No. 10/032,751, filed on Oct. 27, 2001, which is a continuation-in-part of application No. 09/963,812, filed on Sep. 26, 2001.

(60) Provisional application No. 60/277,787, filed on Mar. 21, 2001.

(51) Int. Cl.
*H04K 1/00* (2006.01)
*H04L 9/00* (2006.01)

(52) U.S. Cl. .............................. 705/53; 705/51; 705/52; 705/57; 705/58; 705/64; 705/77; 705/78

(58) Field of Classification Search ................... 705/52, 705/77–79; 725/5, 112
See application file for complete search history.

(56) References Cited

U.S. PATENT DOCUMENTS

| 5,794,210 | A | 8/1998 | Goldhaber et al. | |
|---|---|---|---|---|
| 5,855,008 | A | 12/1998 | Goldhaber et al. | |
| 6,029,141 | A | * | 2/2000 | Bezos et al. ................... 705/27 |
| 6,078,866 | A | | 6/2000 | Buck et al. |
| 6,192,407 | B1 | * | 2/2001 | Smith et al. .................. 709/229 |
| 6,269,361 | B1 | | 7/2001 | Davis et al. |

(Continued)

OTHER PUBLICATIONS

Geravis, D., Electronic Rights Management and Digital Identifier Systems, Mar. 1999, The Journal of Electronic Publishing, vol. 4, Issue 3, pp. 1-25.*

*Primary Examiner*—Andrew J. Fischer
*Assistant Examiner*—Joshua Murdough
(74) *Attorney, Agent, or Firm*—Withrow & Terranova, PLLC

(57) ABSTRACT

A method and system for enabling electronic delivery of files is disclosed. The method and system include maintaining a data repository for storing information relating to the files available in the digital marketplace, wherein the information includes business rules associated with each file that define electronic transfer of the files during commercial transactions. In response to a first user requesting to resell a particular file and thereby becoming a reseller, the data repository is accessed to dynamically generate a reseller uniform resource locator (RURL) that uniquely identifies the reseller and the file. The RURL is then provided to the reseller for posting on a website in order to make the file commercially available to others on the website. In response to a second user clicking on a link to download the file, the business rules associated with the file that is identified in the RURL are retrieved from the data repository in order to customize the download of the file to the second user and to automatically distribute payments to the reseller and owner of the file.

42 Claims, 6 Drawing Sheets

U.S. PATENT DOCUMENTS

| | | | |
|---|---|---|---|
| 6,282,653 B1 * | 8/2001 | Berstis et al. | 726/26 |
| 6,826,594 B1 * | 11/2004 | Pettersen | 709/203 |
| 2001/0032154 A1 * | 10/2001 | Schummer | 705/30 |
| 2002/0007322 A1 * | 1/2002 | Stromberg | 705/26 |
| 2002/0077930 A1 * | 6/2002 | Trubey et al. | 705/26 |
| 2003/0023687 A1 * | 1/2003 | Wolfe | 709/206 |

\* cited by examiner

METHOD AND SYSTEM FOR AUTOMATICALLY DISTRIBUTING FEES, INCLUDING A RESELLER COMMISSION, DURING A DIGITAL FILE TRANSACTION

CROSS-REFERENCE TO RELATED APPLICATIONS

This application is a Continuation-In-Part of U.S. Ser. No. 10/032,751, filed on Oct. 27, 2001, entitled "Digital File Marketplace", which is a Continuation-In-Part of U.S. Ser. No. 09/963,812, entitled "Method And System For Generating Revenue In A Peer-To-Peer File Delivery Network", filed on Sep. 26, 2001, which claims the benefit of Provisional application U.S. Ser. No 60/277,787, filed on Mar. 21, 2001, all assigned to the assignee of the present application and incorporated herein by reference.

FIELD OF THE INVENTION

The present invention relates to an electronic marketplace for the buying and selling of digital files, and more particularly to a method and system for automatically distributing fees, including a reseller commission, during a digital file transaction. The reselling transaction could also occur on another location.

BACKGROUND OF THE INVENTION

The Internet may be viewed as containing distributed information and centralized information. The distributed information is located throughout the Internet and typically takes the form of domain name servers and IP addresses, for instance. The centralized information is content, such as web pages and files, which is stored on and served by central servers.

Gaining access to such centralized content, however, is becoming increasingly difficult due to growing Internet congestion, limited bandwidth, and increasing file sizes (especially for media rich content). Traditional Internet technologies for distributing content, such as e-mail, streaming media, and FTP, have proven inadequate. E-mail is inadequate because due to the number of email messages and attachments passing through email servers, restrictions are placed on the sizes of emails that restricts what can be sent as attachments. E-mail also has security issues. PGP encryption is available for securing e-mails, but is not widely adopted.

Streaming media has the disadvantages of not working with all file types and is expensive because providers must purchase different software for the various streaming media standards. Streaming media also has not proven to be a reliable transfer method. And FTP file transfers also have disadvantages, which include being technically challenging to most users, and suffering from inefficient file transfers. There are other solutions for distributing content, but they are usually proprietary and do not scale well.

Another problem with distributing centralized content is cost. As file sizes increase, the distribution of content is becoming increasingly expensive for content providers due to metered pricing of used bandwidth. In metered pricing, a content provider's Internet-Service-Provider (ISP) monitors the output of the servers used to provide the content, and charges the content provider 95% of the peak usage even though the average output is much lower. Thus, the cost of distributing content from central servers is one reason why attempts have been made to decentralize content.

A further problem with distributing content is that businesses have been unwilling to sell their content on the Internet because of a lack of security, and there is no efficient payment mechanism for small transactions (e.g., less than $10). Consequently, consumers do not have an adequate mechanism for efficiently finding and buying digital items, especially those that would be sold for a minor fee.

Accordingly, what is needed is a method and system for distributing digital files. The method and system should support the buying and selling of the digital files. The method and system should further provide publishers of content a way to sell digital files using multiple business models. The method and system should further automatically distribute fees collected during a digital file transaction in the marketplace to all parties involved, including the file owner and any resellers. The present invention addresses such needs.

SUMMARY OF THE INVENTION

The present invention is a method and system for enabling electronic delivery of files. The method and system include maintaining a data repository for storing information relating to the files available in the digital marketplace, where the information includes business rules associated with each file that define electronic transfer of the files during commercial transactions. In response to a first user requesting to resell a particular file and thereby becoming a reseller, the data repository is accessed to dynamically generate a reseller uniform resource locator (RURL) that uniquely identifies the reseller and the file. The RURL is then provided to the reseller for posting on a website in order to make the file commercially available to others on the website. In response to a second user clicking on a link to download the file, the business rules associated with the file that is identified in the RURL are retrieved from the data repository in order to customize the download of the file to the second user and to automatically distribute payment to the reseller and owner of the file.

According to the method and system disclosed herein, the digital marketplace of the present invention enables transactions between content owners, consumer, and resellers, where payment for the files is automatically collected and distributed to all the relevant parties.

DETAILED DESCRIPTION

The present invention relates to an electronic marketplace for digital files, and more particularly to a method for automatically distributing fees, including a reseller commission, during a digital file transaction. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
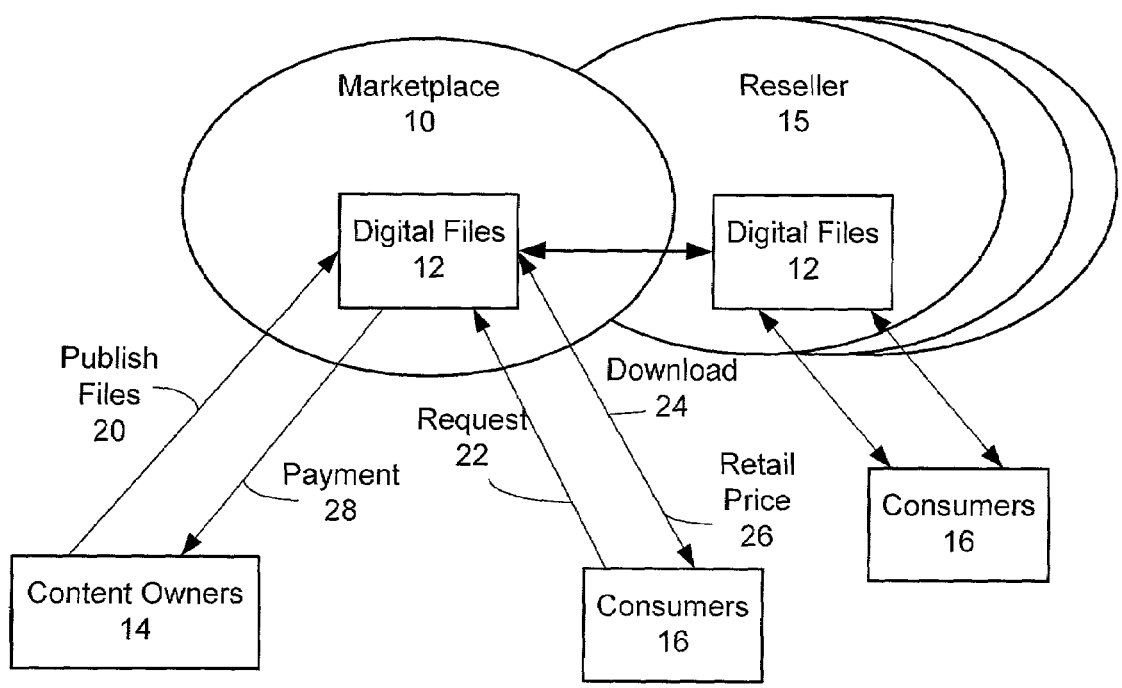
FIG. 1 is a block diagram illustrating an electronic marketplace for buying and selling digital files in accordance with a preferred embodiment of the present invention.

The present invention provides an electronic marketplace for the buying and selling of digital files in which users may become resellers of other's files and receive a portion of the fee collected from the sale of the file as a reseller commission. FIG. 1 is a block diagram illustrating an electronic marketplace for buying and selling digital files in accordance with a preferred embodiment of the present invention. In a preferred embodiment, the digital file marketplace 10 is a website on the Internet that matches the digital files 12 shared by content owners 14 with potential consumers 16. The content owners 14 publish their digital files 12 by posting the files 12 on the marketplace 10 via line 20. Example type of content files 12 may include audio files, cell phone ring tones, video files, news articles and online magazines, image files, and confidential documents, for instance. And examples of content owners 14 include shareware publishers, musicians, artists and designers. Resellers 15 are third parties who also offer the files 12 to the public on a third party website.

Once the files 12 are posted, the consumers 16 can search for and request files 12 for downloading via line 22 either from the marketplace 10 or the reseller 15. In a preferred embodiment, consumers 16 may also request a subscription to certain files 12. After the file 12 is downloaded to the user via step 24, the consumer 16 may be charged a fee for the file 12 via line 26.

According to the present invention, the marketplace 10 allows the content owners 14 to set both the retail price charged to the consumer 16, as well as a commission paid to the reseller 15. The marketplace 10 generates revenue by charging the content owners 14 transaction fees. Thus, when the consumer 16 downloads a file 12, the consumer 16 is charged the retail price set by the owner. The transaction fee charged by the marketplace and any reseller commission is then subtracted from the retail price collected from the consumer 16. The marketplace 10 then transfers any remaining money to the content owner 14 as payment.

According to a further aspect of the present invention, the marketplace 10 allows the content owners 14 to set the retail price and the reseller commission in real-time. In addition, both the retail price and the reseller commission may be set as either positive or negative numbers, creating unique pricing models for the marketplace 10.

Figure 2:
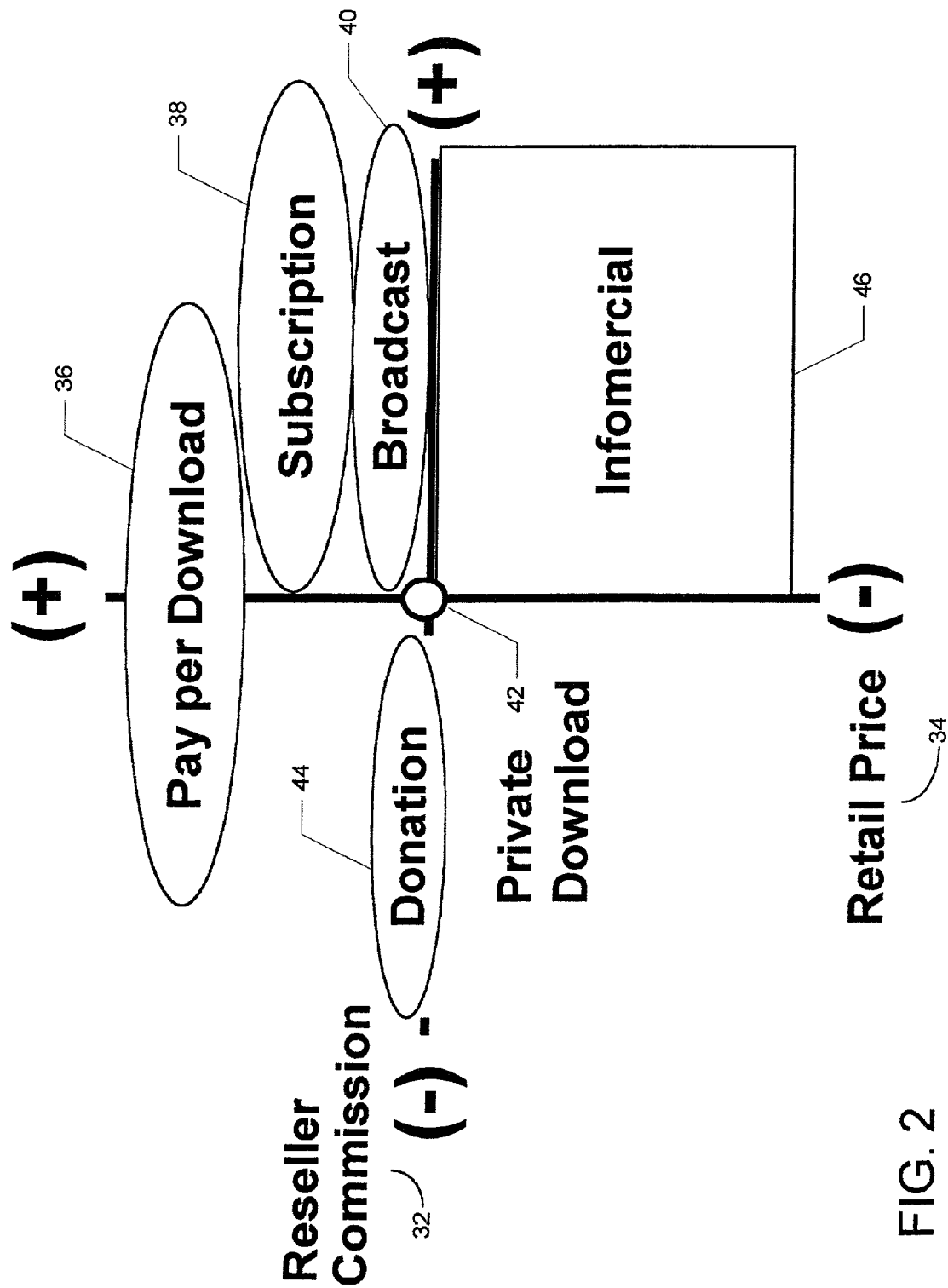
FIG. 2 illustrates a graph showing the pricing model for the marketplace that results from a combination of positive and negative retail prices and reseller commissions.

FIG. 2 illustrates a graph showing the pricing models 30 for the marketplace 10 that results from a combination of positive and negative retail prices and reseller commissions. The x-axis of the graph represents the reseller commission 32, while the y-axis represents the retail price 34. According to the present invention at least six pricing models for file downloads may be implemented within the digital marketplace 10. The pricing models 30 supported include a pay-per-download model 36, a subscription model 38, a broadcast model 40, a private download model 42, a donation model 44, and an infomercial model 46.

The pay-per-download model 36 is ideal for delivering branded content, such as music, movies, the books, and software. The pay-per-download 36 is represented when the retail price is set high and the reseller commission ranges between mid-positive and mid-negative. An example of a pay-per-download 36 is when the content owner 14 sets the retail price of a movie file at $5, and sets the reseller commission at $1. Assuming the marketplace 10 charges a $0.50 transaction fee, then the content owner 14 will receive a net payment of $3.50 per download.

The subscription model 38 is useful for delivering content such as clip art, movie trailers, and promotion music. The subscription model 38 is represented when the retail price is set at mid-positive and the reseller commission ranges from zero to positive. An example of a subscription 38 is when the content owner 14 sets the retail price of an online video show at $4.95, and sets the reseller commission at $1.00. Assuming the marketplace 10 charges a $2.45 transaction fee, then the content owner 14 will receive a net payment of $1.50 per download.

The broadcast model 40 is ideal for delivering advertising type content. The broadcast model 40 is represented when both the retail price and the reseller commission range from zero to positive. An example of a broadcast 40 is when the content owner 14 sets the retail price of an advertisement at $0.00, and sets the reseller commission at $0.05. Assuming the marketplace 10 charges a minimal transaction fee of $0.02, the content owner 14 will end up paying $0.07. However, if the advertisement results in a sale of $0.20, then the content owner 14 nets $0.13.

The private download model 42 is a file transfer between two consumers 16 and is ideal for delivering content that needs a secure delivery method and is not typically publicly available in the marketplace 10. The private download 42 is represented when both the retail price and the reseller commission are set at zero. Assuming the marketplace 10 charges a minimal transaction fee of $0.02, then whoever is transferring the file will net −$0.02.

The donation 44 occurs when the reseller pays the content owner 14 to deliver a particular file 12 to the consumer 16 for free. Thus, the donation model 44 is represented when the retail price is zero or slightly positive and the reseller commission is negative.

The infomercial model 46 is used to deliver infomercials, where the content is generally of no interest to the consumer 16, so the content owner 14 must pay the consumer 16 to download and view it. The infomercial 46 is represented when the retail price of a file 12 is negative and the reseller commission is positive.

Although not shown in FIG. 2, the marketplace 10 of the present invention also enables the reseller 15 to offer rebates to the consumers 16. Assume for example, that a reseller 15 offers to resell a content owner's file of the reseller's website and is paid a commission of $1 per copy. The reseller 15 could offer consumers $0.50 off of the retail price in order to increase the number of consumers who download the file from the reseller's website. In this model, the marketplace 10 supports a suggested resell price vs. the actual retail price, which is commonly referred to as discounting.

Thus, according to the present invention, the digital marketplace enables transactions between content owners 14, consumer 16, and resellers 15, where the combination of retail price and reseller commission set by the content owner 14 automatically determines the distribution model for the files 12. And in certain pricing circumstances, the present invention may also provide facilities to allow person-to-person money transfers.

Figure 3:
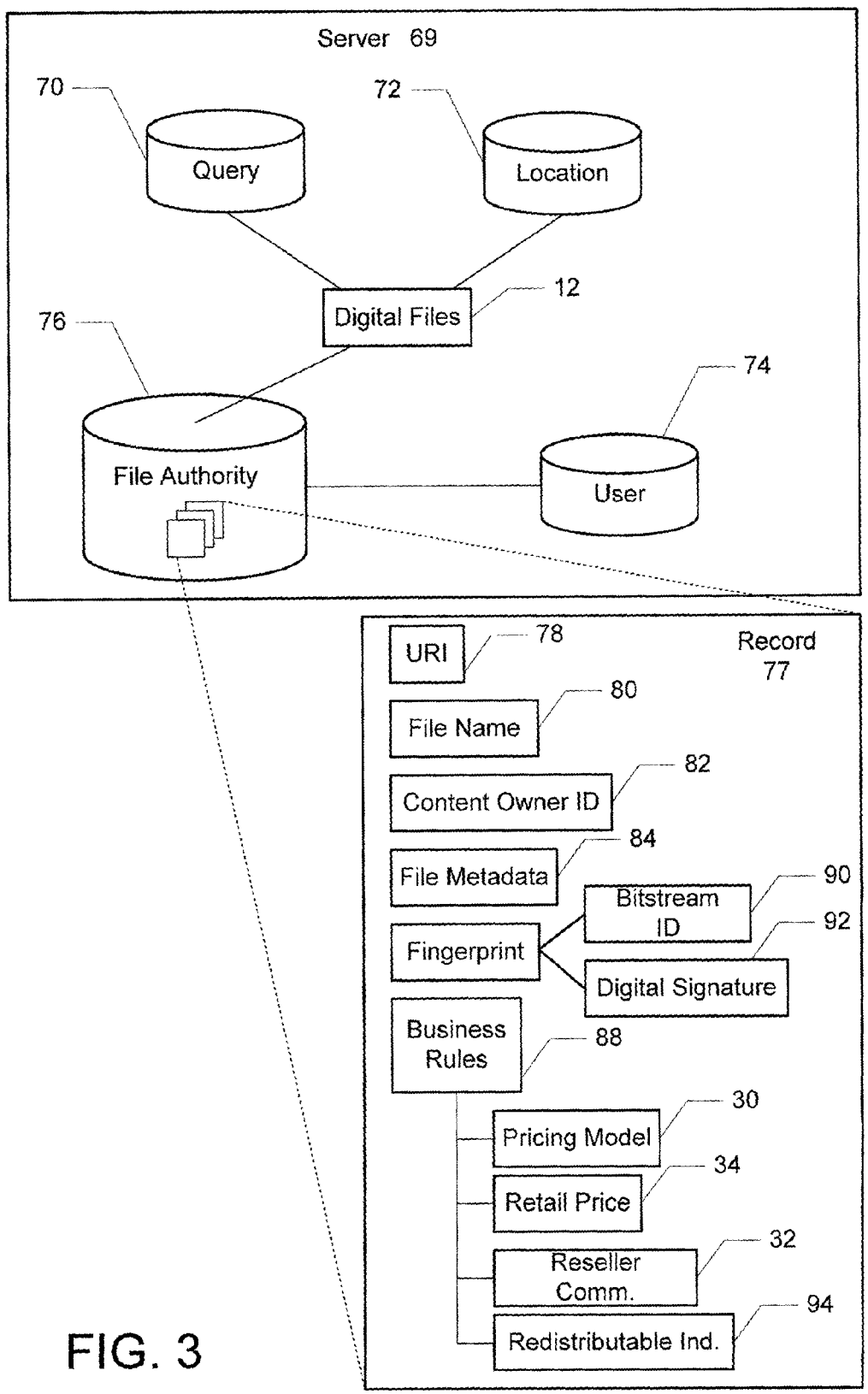
FIG. 3 is a block diagram illustrating a server that provides the website for the marketplace.

FIG. 3 is a block diagram illustrating a server that provides the website for the marketplace 10. The functional blocks of the server 69 are also shown in accordance with a preferred embodiment of the present invention. It should be understood that the functional blocks may reside on the same or different computer than the server 69 and that the server 69 itself may comprise more than one computer.

The primary functions of the server 69 are to authenticate users of the marketplace 10, receive and store the files when published by the content owners 14, and perform file delivery. The server 69 also allows the content owners to manage distribution of their files 12, and allows users to perform searches for files 12 to download, as described below. If any fees are required, the server 69 facilitates all the payment processing, thereby providing a self-contained digital marketplace 10.

As shown in FIG. 3, the server node 69 includes a query database 70, a location database 72, a user database 74, and a file authority repository 76. The query and location databases 70 and 72 store the names and locations of the files 12 shared on the network, respectively. And the user database 32 includes account information for the consumers 16 of the client nodes 68. The file authority 76 is a data repository that stores metadata and business rules that are associated with each file to control now commercial transactions are conducted, including distribution of funds to all parties involved. The file authority 76, the query database 70, the location database 72, and the user database 74 may each communicate with each other.

In accordance with one aspect of the present invention, the file authority 76 includes a record 77 for each file 12 in the marketplace 10 to control file organization, searching, and transactions. The file authority 76 may also be used to block redistribution of a file, as described below.

In a preferred embodiment, each record 77 in the file authority 76 includes fields that reference the query and location databases 74 and 76 and the user database 32 to identify the location of files and the owner of the files. Each record 77 also stores the business rules 88 associated with the file.

In a preferred embodiment, the records 77 for each file in the file authority 76 include the following fields: A uniform resource indicator 78, file name 80, a content owner ID 82, file metadata 84, a fingerprint 86, and business rules 88.

The uniform resource indicator (URI) 78 is used to identify each file, similar to a part number. The name of the file 12 is preferably stored in the query database 70, while the content owner ID 82, which identifies the content owner 14 is stored in the location database 72. The file metadata 84 includes miscellaneous file information, such as the file size, the bit rate of the file, key words used for finding the file during searches, and so on.

The fingerprint 86 uniquely identifies each file 12 by the content contained therein. Identifying the files 12 by the fingerprint 86 allows the same file 12 to be searched and/or compared based on the content of the file 12, rather than by the name of the file 12, which are inconsistent. In a preferred embodiment, the fingerprint 86 for each file 12 is created when the file 12 is published. First, a bitstream ID 90 is generated for the file 12 by calculating binary values in data blocks of the file 12 itself. In a preferred embodiment, the bitstream ID 90 is computed using a Secure Hash Algorithm (SHA-1), which is a one-way hash algorithm. Other algorithms may also be used, including MD4 and MD5 algorithms. A digital signature 92 may also be generated for the file 12 to validate the owner of the file 12. Together, the bitstream ID 90 and the digital signature 92 may form the fingerprint 86 for the file 12. The fingerprint 86 ensures that the file 12 is transmitted in its original state (data integrity) by the identified content owner/publisher. The file fingerprints 86 may be stored within the file 12 authority 76 or in a separate database.

The business rules 88 control how the file 12 and payments are commercially distributed. In a preferred embodiment, the business rules 88 specify the pricing model 30 that has been associated with the file 12, and optionally the retail price 34, and reseller commission 32.

According to the present invention, the business rules 88 further include a redistributable indicator 94 that indicates whether the file is redistributable. This indicator 94 has two uses. Normally the indicator 94 is used to indicate whether or not the file as eligible for resell by a reseller. But the redistributable indicator 94 may also be used to indicate that the file has been registered with the file authority 76 as not to be made available on the network at all. This allows for the enforcements of copyrights on request when a third party notifies the network that a particular file 12 is copyrighted and cannot be copied without permission of the owner, or can only be available for sharing on the network by the owner. In addition, if the file is made available on the network by another, the publisher of the copyright infringing file can be tracked, since information identifying the publisher is collected from each consumer in order join the network. It should be noted that an infringing file can be found by comparing the bitstream IDs 90 of the allegedly infringing file with the registered file, rather than comparing their file names 80.

Figure 4A:
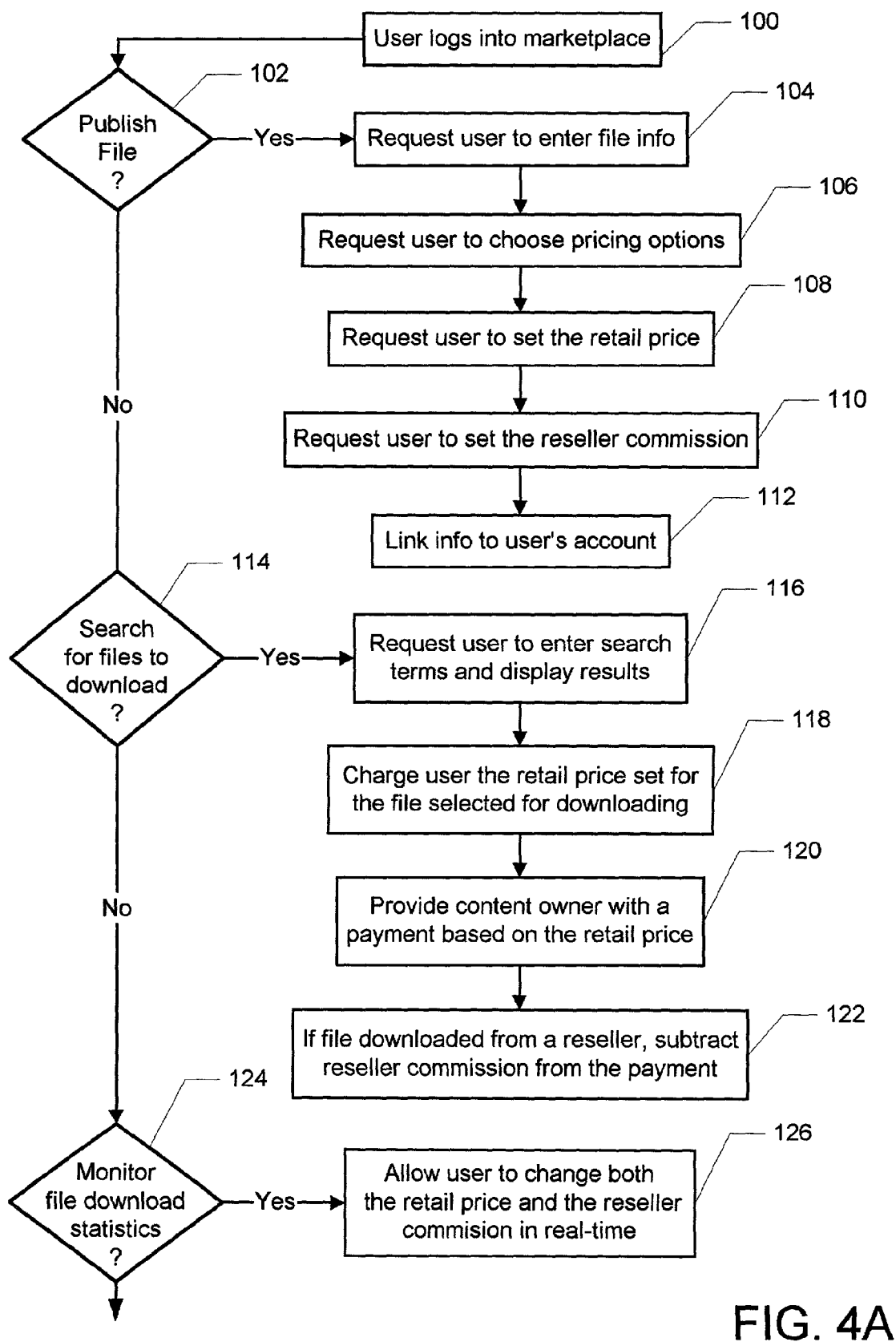
FIGS. 4A and 4B are flowcharts illustrating the process of providing an online digital marketplace for digital files in accordance with a preferred environment of the present intention.
Figure 4B:
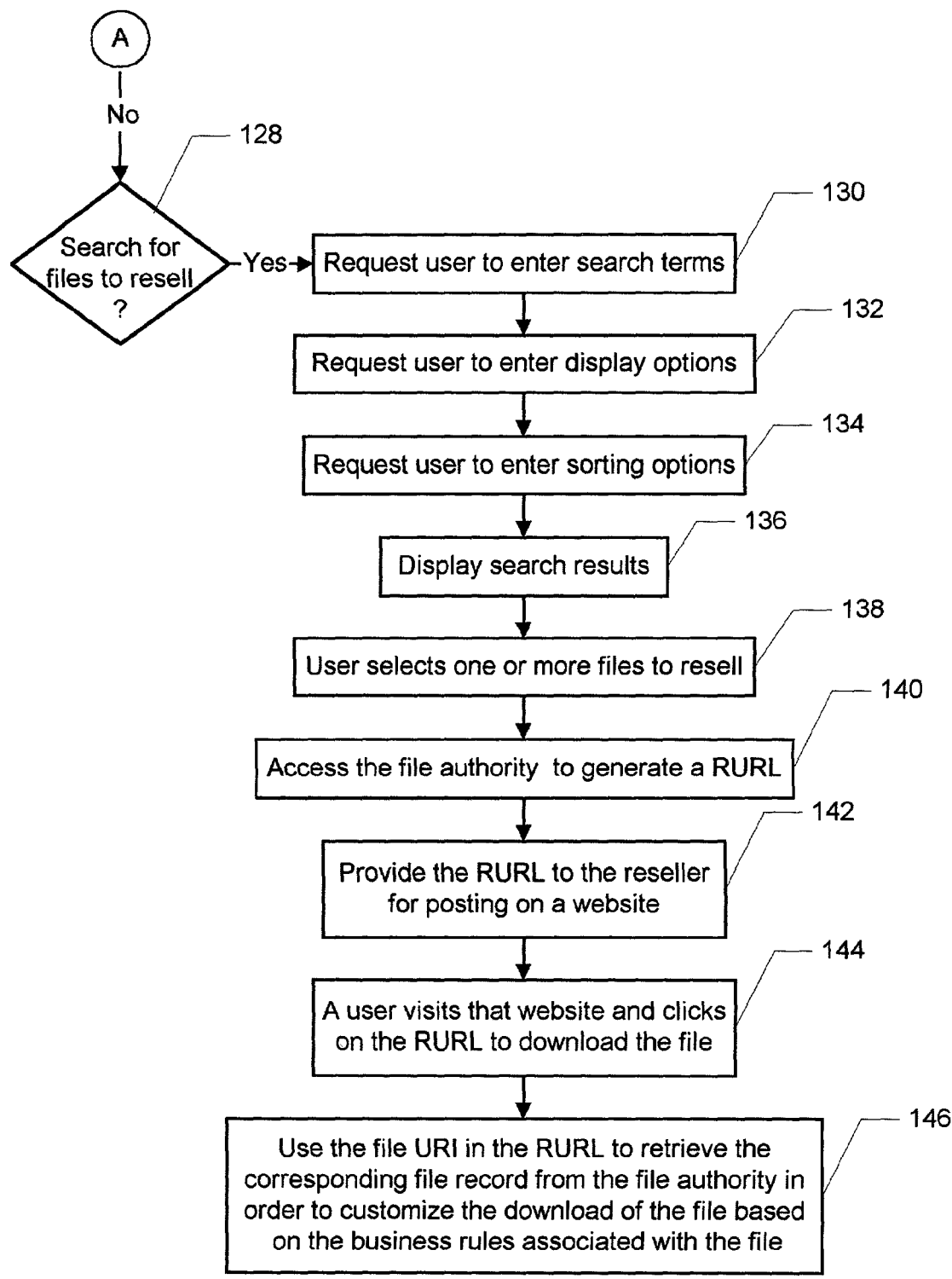

Referring now to FIGS. 4A and 4B, a flowchart illustrating the process of providing an online digital marketplace for digital files in accordance with a preferred environment of the present intention is shown. The process begins when a user of the marketplace 10 logs into the marketplace 10 in step 100. Depending on the options chosen by the user during his/her online session, the user may become a content owner 14, a consumer 16 and/or a reseller 15.

In step 102, it is determined whether the user has chosen the option to publish a file 12 by posting it on the marketplace 10. If the user chooses to publish a file 12, then the user is requested to enter file information in step 104, and choose pricing options for the file in step 106. In a preferred environment, the pricing options include a subscription plan, a pay-per-download, and a publisher-sponsored download. The selected pricing option and the ID of the content owner are stored in the file authority record 77 created for the file.

According to one aspect of the present invention, the user is also requested to set the retail price for the file in step 108, and to set the reseller commission in step 110. This information is also stored in the file authority record 77 and linked to the user's account for tracking the download statistics for the file in step 112. As soon as the user's file is received on the marketplace 10, the file is made available for searching by others. In a further embodiment, the user may be allowed to set a "collections" option for the file, which is a database field that enables unique views into the database to be created for viewing payment statistics for the file.

In step 114, it is determined whether the user has chosen the option to search for files to download. If so, then the user is requested to enter search terms and the search results are displayed in step 116. In response to the user selecting one of the files to download, the user is charged the retail price set for the file in step 118. The content owner is then provided with a payment based on the retail price less the transaction fee in step 120. If, however, the user downloads the file from a reseller, then the reseller commission is also subtracted from the content owner's payment in step 122.

In step 124, it is determined if the user has chosen the option to monitor download statistics for the file(s) 12 that the user posted on the marketplace 10. Once viewing the download statistics for particular file, the user may choose to edit the file information and to change the retail price and the reseller commission for the file in real-time in step 126. The download statistics displayed to the user may also include information that allows the user to track usage and payments for bandwidth used to deliver the file from users and their ISP's, which will be important in the future as traffic increases and ISP's need to get paid for aiding in the file sharing.

In step 128, it is determined whether the user has chosen the option to search for a file(s) 12 in the marketplace 10 to resell on a third party website. If the user chooses the option to search for files 12 to resell, then the user is requested to enter search terms in step 130. The user is also given the option to select display options to limit the search results to certain types of matching files in step 132. In a preferred embodiment, display options may include showing only free files, pay-per-download files, or files listed as resalable.

The user is also given the option to enter sorting options in step 134. In a preferred embodiment, the sorting options may include sorting the matching files by popularity, by date, by size, by price, and by the reseller commission. The search results are then displayed in step 136. Thus, according to the present invention, potential resellers may search for files having a particular content and the highest reseller price. In response to the user selecting one or more of the files to resell in step 138, the user is added to the list of resellers for the file.

In accordance with a further aspect of the present invention, the marketplace 10 provides the reseller a link to the file by accessing the file authority 76 to dynamically generate a reseller uniform resource locator (RURL) that uniquely identifies the reseller and the file or files in step 140. According to the present invention, a RURL includes all information necessary to track and complete a commercial transaction for the file or files. In a preferred embodiment, the RURL includes a web address of the marketplace 10, the URI 78 of the file that uniquely identifies the file, and the user ID of the reseller.

After the RURL is generated, the RURL is provided to the reseller in step 142 for posting on a website in order to make the file commercially available to others on the website. In a preferred embodiment, the RURL is provided by displaying the RURL and allowing the reseller to copy and paste the RURL on the website. Alternatively, the RURL could be provided via email.

Once the RURL is posted on a website and a user visiting that website clicks on the RURL to download the file in step 144, the file URI in the RURL is used to retrieve the file record 77 from the file authority 76 in order to customize the download of the file based on the business rules 88 associated with the file step 146.

More specifically, when the RURL is clicked, the user's browser is directed to the IP address in the RURL. In response, the server 69 uses the URI in the RURL to retrieve the corresponding record 77 for the file 12 from the file authority 76. The server 69 then uses the record 77 to determine the pricing model 30 associated with the file and the retail fee of the file 12, if any. If there is a retail price 34 associated with the file 12, the server charges the user and the file 12 is downloaded to the user. If the user is a member of the marketplace 10, then the retail price 34 may be debited from the user's account, assuming the user is logged in. If the user is not a member of the marketplace 10, then the user may be prompted to enter credit card information. After the retail price 34 has been charged, the reseller commission is deducted from the price charged to the user and is provided to the reseller identified in the RURL, preferably by crediting the reseller's user account. The server 69 also identifies the content owner from the record 77 and provides the retail price minus the reseller commission (if any) to the content owner 14.

Thus, through the file authority 76, the marketplace 10 is able to generate a single RURL that when activated, results in the electronic delivery of a file 12 and automatically distributes fees to both the reseller and the owner of the file.

As an example of the electronic file marketplace 10, assuming that an independent film producer wants to earn money from online distribution, but doesn't have a way to distribute or to bill the end-user. The producer signs up with the file marketplace 10 and posts his films on the digital marketplace 10. The films join thousands of other media files 12 from other content owners 14 in areas such as, videos, music, ebooks, software, and games. In addition, the publisher sets the retail price and the reseller commission, and can choose to make the films available as a subscription service to the end-users. Assume further that a user logs onto the marketplace 10 and finds one of the films during a search and downloads the film. The user's account would be charged the retail price 34 for the file. The producer would be paid the retail price 34 collected for that file, less any transaction fee charged by the marketplace 10 and reseller commission.

In a further aspect of the present invention, the content owner 14 may also monitor and dynamically change the retail price and reseller commission for their files in real-time. The digital marketplace 10 links the download activities of the producer's files to the producer's account, so the producer may log-in and monitor who is downloading which files and at what costs. While monitoring the download activity of his films, the publisher notices that consumer demand is higher than expected, so he may decide that the consumers 16 should pay more to download the films. The producer may also decide that he is paying the resellers too much to distribute the films, and wants to keep more of the retail price for himself. Therefore, the producer would raise the retail price of the films and lower the reseller commissions, and the changes would take place in real-time.

Although the preferred embodiment of the present invention is described in terms of implementing the marketplace 10 as a website, the present invention may also be implemented as a peer-to-peer network to provide distributed storage and downloading of the files. The peer-to-peer implementation effectively distributes network bandwidth and increases the efficiency at which the files 12 are delivered to the consumers 16. In the peer-to-peer embodiment, consumers 14 may also donate unused bandwidth of their computers to the marketplace 10 for the delivery of files 12 to other consumers 14, thereby increasing the bandwidth allocation of the network.

Figure 5:
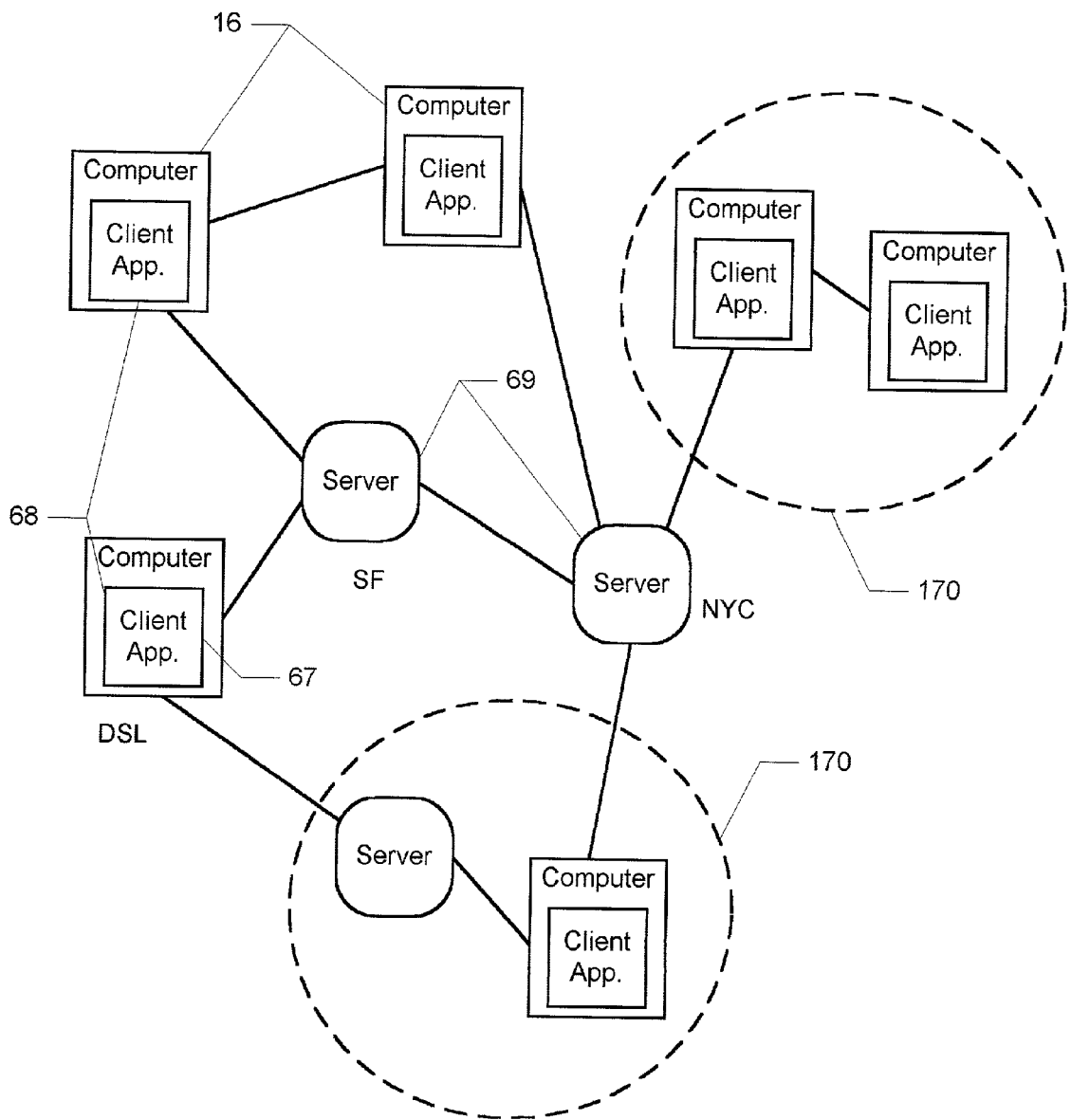
FIG. 5 is block diagram illustrating a peer-to-peer (P2P) network architecture in accordance with one preferred embodiment of the present invention.

FIG. 5 is block diagram illustrating a peer-to-peer (P2P) network architecture in accordance with one preferred embodiment of the present invention. The peer-to-peer network 64 includes a plurality of computers 16 interconnected over a public network, such as Internet, where some of the computers 16 are configured as server nodes 69, and other computers 16 are configured as client nodes 68. A client node 68 may represent a single computer or a proprietary network, such as AOL, or a cable network, for example, and in a preferred embodiment, the server nodes 69 are located worldwide. The network enables secure and reliable peer-to-peer file sharing between client nodes 68 where consumers 16 may share content using both 1-to-1 and 1-to-many file transfers without the need for going through a server. The network also enables subscription-based decentralized file downloads to the client nodes 68, where consumers 16 may schedule delivery of content over the network.

Any combination of server nodes 69 and client nodes 68 may form extranets 170 that are protected by firewalls (not shown). As is well known in the art, an extranet 70 is basically a private network that uses the public Internet as its transmission system, but requires passwords to gain entrance.

The primary purpose of the peer-to-peer network 64 is the propagation of content over the network. Both the content owners 14 and the consumers 16 have a vested interest in secure and reliable delivery of the files 12. A user's files 12 may reside on the server nodes 69 on a client node 68, or both. The present invention makes no distinction; it is only a matter of where the file is retrieved for delivery to another node during file sharing.

Consumers 14 configure their computers 16 as client nodes 68 by installing and running a P2P client application 67 designed for public networks that operates as described herein. In operation, the client application 67 allows the client node 68 to authenticate other client nodes 68 and to both receive files 12 and serve files 12.

The server nodes 69 facilitate the file sharing process by performing the functions of the server described above with the addition of the following functions. One additional function of the server nodes 69 is to aid the client nodes 68 in authenticating other client nodes 68 and file transfers during direct client-node transfers. Another function related to file delivery includes a) providing subscription-based decentralized file downloads that allow the client nodes 68 to subscribe and automatically receive periodically updated files 12 (push technology), and b) storing files 12 when a client node 68 publishes a file for subsequent delivery to a requester by the server when the publishing node is off-line. A further function of the server nodes 69 (and the client nodes) is to serve as proxies to the extranets 170 so that the client nodes 68 inside the extranets 170 can be part of the peer-to-peer network through the extranet 70 firewalls.

A method and system for automatically distributed fees collected during a digital file transaction in the marketplace to all parties involved, including the file owner and reseller has been disclosed. Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the appended claims.

What is claimed is:

1. A method for enabling electronic delivery of files in a digital marketplace, the method comprising the steps of:
   (a) maintaining a data repository for storing information relating to the files available in the digital marketplace, including business rules associated with each file that define electronic transfer of the files during commercial transactions;
   (b) in response to a first user requesting to resell a particular file and thereby becoming a reseller, using the data repository to dynamically generate a reseller uniform resource locator (RURL) that uniquely identifies the reseller and the file;
   (c) providing the RURL to the reseller for posting on a website in order to make the file commercially available to others on the website; and
   (d) in response to a second user clicking on a link to download the file, retrieving from the data repository the business rules associated with the file identified in the RURL to customize the download of the file to the second user and to automatically distribute payments to the reseller and owner of the file.

2. The method of claim 1 wherein step (a) further includes the step of: providing within the business rules a pricing model associated with the file.

3. The method of claim 2 wherein step (a) further includes the step of: storing a record for each file that includes fields for identifying a location of the file and the owner of the file.

4. The method of claim 3 wherein step (a) further includes the step of: providing each record with a file ID, a file name, a content owner ID, metafile information, a fingerprint, and the business rules.

5. The method of claim 4 wherein step (a) further includes the step of: providing the business rules with a redistributable indicator that indicates whether the file is redistributable.

6. The method of claim 4 wherein step (a) further includes the step of: using the fingerprint to uniquely identify each file by content of the file.

7. The method of claim 6 wherein step (a) further includes the step of: generating a bitstream ID by calculating binary values in data blocks of the file.

8. The method of claim 2 wherein step (d) further includes the step of:
   (i) charging the second user a retail price for downloading the file.

9. The method of claim 8 wherein step (a) further includes the step of:
   (i) allowing a content owner to set the retail price and a reseller commission both positively and negatively.

10. The method of claim 2 wherein step (b) further includes the step of:
    (i) providing the RURL with a web address of the marketplace, the file ID, and the user ID of the reseller.

11. The method of claim 10 wherein step (b) further includes the step of:
    (i) providing the RURL by displaying the RURL and allowing the reseller to copy and paste the RURL on the website.

12. The method of claim 10 wherein step (b) further includes the step of:
    (i) providing the RURL via email.

13. The method of claim 1 further including the step of: implementing the digital marketplace as a website on a network.

14. The method of claim 1 further including the step of: implementing the digital marketplace as a peer-to-peer network.

15. A computer-readable medium containing program instructions for enabling electronic delivery of files, the instructions for:
    (a) maintaining a data repository for storing information relating to the files available in a digtal marketplace, including business rules associated with each file that define electronic transfer of the files during commercial transactions;
    (b) in response to a first user requesting to resell a particular file and thereby becoming a reseller, using the data repository to dynamically generate a reseller uniform resource locator (RURL) that uniquely identifies the reseller and the file;
    (c) providing the RURL to the reseller for posting on a website in order to make the file commercially available to others on the website; and
    (d) in response to a second user clicking on a link to download the file, retrieving from the data repository the business rules associated with the file identified in the RURL to customize the download of the file to the second user and to automatically distribute payment to the reseller and owner of the file.

16. The computer-readable medium of claim 15 wherein instruction (a) further includes the instruction of: providing within the business rules a pricing model associated with the file.

17. The computer-readable medium of claim 16 wherein instruction (a) further includes the instruction of: storing a record for each file that includes fields for identifying a location of the file and the owner of the file.

18. The computer-readable medium of claim 17 wherein instruction (a) further includes the instruction of: providing each record with a file ID, a file name, a content owner ID, metafile information, a fingerprint, and the businesses rules.

19. The computer-readable medium of claim 18 wherein instruction (a) further includes the instruction of: providing the business rules with a redistributable indicator that indicates whether the file is redistributable.

20. The computer-readable medium of claim 18 wherein instruction (a) further includes the instruction of: using the fingerprint to uniquely identify each file by content of the file.

21. The computer-readable medium of claim 20 wherein instruction (a) further includes the instruction of: generating a bitstream ID by calculating binary values in data blocks of the file.

22. The computer-readable medium of claim 16 wherein instruction (d) further includes the instruction of:
(i) charging the second user a retail price for downloading the file.

23. The computer-readable medium of claim 22 wherein instruction (a) further includes the instruction of:
(i) allowing a content owner to set the retail price and a reseller commission both positively and negatively.

24. The computer-readable medium of claim 16 wherein instruction (b) further includes the instruction of:
(i) providing the RURL with a web address of the marketplace, a file ID, and a user ID of the reseller.

25. The computer-readable medium of claim 24 wherein instruction (b) further includes the instruction of:
(i) providing the RURL by displaying the RURL and allowing the reseller to copy and paste the RURL on the website.

26. The computer-readable medium of claim 24 wherein instruction (b) further includes the instruction of:
(i) providing the RURL via email.

27. The computer-readable medium of claim 15 further including the instruction of: implementing the digital marketplace as a website on a network.

28. The computer-readable medium of claim 15 further including the instruction of: implementing the digital marketplace as a peer-to-peer network.

29. A system for enabling electronic delivery of files over a network comprising a plurality of client computers, comprising:
a digital marketplace including a server coupled to the network;
a data repository accessible by the server that stores information relating to the files available in the digital marketplace, wherein the information includes business rules associated with each file that define electronic transfer of the files during commercial transactions;
wherein in response to a first user contacting the server and requesting to resell a particular file and thereby becoming a reseller, the server:
uses the data repository to dynamically generate a reseller uniform resource locator (RURL) that uniquely identifies the reseller and the file, and
provides the RURL to the reseller for posting on a website in order to make the file commercially available to others on the website; and
in response to a second user clicking on a link to download the file, the server retrieves from the data repository the business rules associated with the file identified in the RURL to customize the download of the file to the second user and automatically distributes payments to the reseller and owner of the file.

30. The system of claim 29 wherein the business rules include a pricing model associated with the file.

31. The system of claim 30 wherein the data repository includes a record for each file that includes fields for identifying a location of the file and the owner of the file.

32. The system of claim 31 wherein each record includes a file ID, a file name, a content owner ID, metafile information, a fingerprint, and the businesses rules.

33. The system of claim 32 wherein the business rules further include a redistributable indicator that indicates whether the file is redistributable.

34. The system of claim 32 wherein the fingerprint uniquely identifies each file by the content of the file.

35. The system of claim 34 wherein the fingerprint includes a bitstream ID, which is generated by calculating binary values in data blocks of the file.

36. The system of claim 30 wherein the second user is charged the retail price for downloading the file.

37. The system of claim 36 wherein the content owner can set a retail price and a reseller commission both positively and negatively.

38. The system of claim 30 wherein the RURL includes a web address of the marketplace, a file ID, and a user ID of the reseller.

39. The system of claim 38 wherein the RURL is provided by displaying the RURL and allowing the reseller to copy and paste the RURL on the website.

40. The system of claim 38 wherein the RURL is provided via email.

41. The system of claim 29 wherein the digital marketplace is implemented as a website on a network.

42. The system of claim 29 wherein the digital marketplace is implemented as a peer-to-peer network.

* * * * *